No. 780,096. PATENTED JAN. 17, 1905.
H. GEPPERT.
ABSORPTION REFRIGERATING APPARATUS.
APPLICATION FILED APR. 2, 1902.
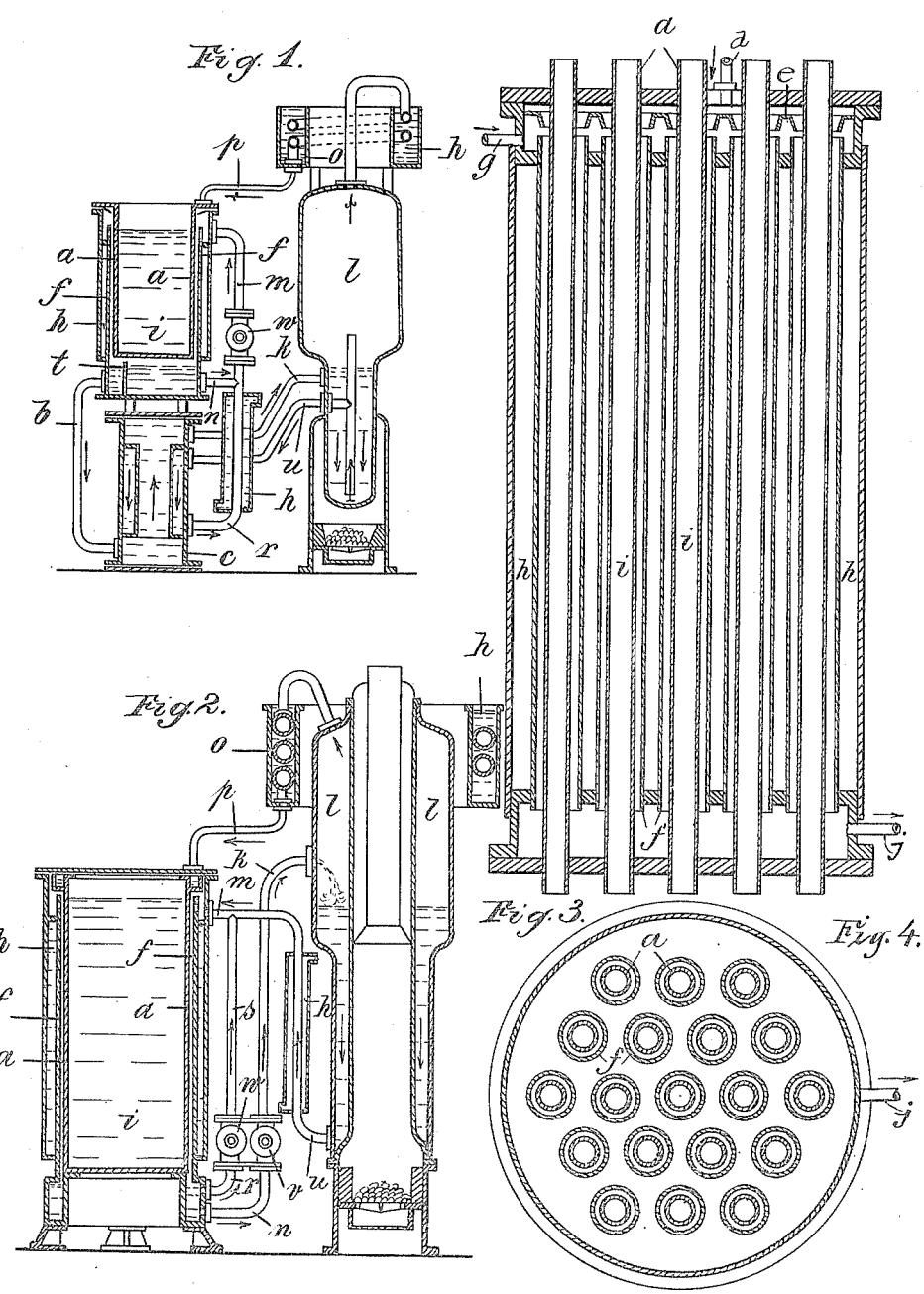
WITNESSES:
John A. Kehlenbeck
John Lotka
INVENTOR
Hermann Geppert
BY Briesen & Knauth
his ATTORNEYS No. 780,096.

Patented January 17, 1905.

UNITED STATES PATENT OFFICE.

HERMANN GEPPERT, OF KARLSRUHE, GERMANY.

ABSORPTION REFRIGERATING APPARATUS.

SPECIFICATION forming part of Letters Patent No. 780,096, dated January 17, 1905.

Application filed April 2, 1902. Serial No. 101,015.

*To all whom it may concern:*

Be it known that I, HERMANN GEPPERT, engineer, residing at Kaiserstrasse No. 67, Karlsruhe, in the Grand Duchy of Baden, Germany, have invented new and useful Improvements in Absorption Refrigerating Apparatus, of which the following is a specification.

The present invention relates to improvements in absorption refrigerating apparatus which is especially applicable to the refrigerating process described in United States Letters Patent No. 662,690, dated November 27, 1900.

The accompanying drawings, which form part of this specification, are adapted to illustrate my invention.

In the drawings, Figure 1 is a vertical sectional view of an apparatus according to this invention. Fig. 2 is a similar view of another form of such apparatus. Fig. 3 is a vertical sectional view of still another form of construction, showing an absorber and vaporizer with a plurality of tubes. Fig. 4 is a transverse section of Fig. 3.

The refrigerating process according to the said United States Letters Patent requires in the vaporizer and the absorber large evaporating and absorbing surfaces situated at a very short distance from each other, so that the vapor produced in large quantities is diffused from the evaporating-surface through this small space to the absorbing-surface.

In the present method of arrangement an inner tube (or vaporizer) $a$ is fitted with a very small clearance into an outer concentric tube (or absorber) $f$, as it is illustrated by Figs. 1 and 2. For increasing the productive power of the apparatus of course several such elements $a f$ (that is, an inner and an outer tube) may be combined. The outer surface of the inner tube $a$ is kept wet with the evaporating fluid (for instance, ammonia) which is brought through a pipe $p$ from a condenser $o$, where it has been condensed. The fluid evaporates and cools the refrigerating or inner tube $a$ and salt water $i$ contained in it. The resulting vapor spreads over the inner surface of the outer tube or absorber $f$ and is absorbed by the suitable absorption fluid which is kept flowing down the latter.

As illustrated by Figs. 3 and 4, the vaporizer and the absorber may be constructed of a number of the inner and outer tubes $a$ and $f$, as described, over the opposing surfaces of which the evaporating and the absorption fluids, respectively, run. The inner tubes $a$ are adapted to contain brine $i$, which is to be refrigerated. The evaporating liquid (as, for instance, ammonia) is introduced at $d$ and directed by funnel-shaped guides $e$ to flow over the outer surfaces of the inner tubes $a$. The absorption liquid is admitted at $g$ and flows over the inner surfaces of the outer tubes $f$. The resulting liquid passes out of the apparatus at $j$. The outer tube is surrounded by a jacket, through which cold water $h$ passes. Obviously in the construction shown in Figs. 1 to 4 the inner tube $a$ may be made the absorber and the outer one, $f$, the vaporizer, in which case the inner one must be kept wet with the absorption fluid and the outer one with the evaporating fluid. In this case the salt water should surround the outer tube, and the cold water should be contained in the inner tube. To insure the constant and uniform damping of their surfaces, the outer and inner tubes may be covered with a porous or absorbent material.

In Fig. 1 the absorption fluid flowing down along the inner surface of the outer tube $f$ is separated by a partition or division $t$ into two portions, one of which flows through a pipe $b$ to a heat-regulator $c$ and thence through another pipe, $k$, to a boiler or heater $l$. The heat-regulator is a heat-exchange apparatus in which the liquid flowing from the pipe $b$ to the pipe $k$ is heated, so that it reaches the boiler $l$ in a relatively warm condition, thus reducing the consumption of fuel. On the other hand, the hot spent liquid flowing from the boiler through the pipe $u$ is cooled as it passes through the regulator $c$ on its way to the pipe $r$ and to the absorber-tube $f$, so that the liquid reaches the absorber in a comparatively cool condition, in which it is best suited for effectively absorbing the vapors.

The used absorption fluid, as stated, passes from the boiler $l$, through a pipe $u$ and through the heat-regulator $c$ and another pipe, $r$, to a pump $w$. The other part of the absorption fluid also passes through a pipe *m* to the same pump *w*. Both parts of the absorption fluid are then pumped by the pump *w* to the tube or tubes *f*, constituting the absorber, to flow down on that surface of the absorber-tube which faces the vaporizer-tube. The double cycle of the operation then recommences. The object and advantage of this double cycle is that an energetic dampening or saturation of the absorber is effected without the entire quantity of the circulating absorption fluid having to pass through the boiler *l* and become heated thereby. This obviously means a material economy of fuel, as well as facilitating the cooling of the absorbing liquid to the temperature it should have at the top of the absorber-tube *f*. This double cycle of movement may be effected, as shown in Fig. 2, by means of a pump *w*, which only keeps the absorber *f* moistened or saturated by means of pipes *r*, *s*, and *m*, while another pump, *v*, causes the absorption fluid to circulate through suitably-arranged pipes *n k* to the boiler *l*, and thence through other pipes, *u m*, to the absorber *f*. Obviously a suitable heat-regulator corresponding to the one lettered *c* in Fig. 1 can also be provided in this arrangement.

The vapor of the vaporizing fluid driven off from the absorption fluid in the boiler *l* is condensed in a condensor *o*, whence it runs back through a pipe *p* to the vaporizer *a* first described. The upper part of the boiler *l* is enlarged and serves partly as a fluid-separator and partly as an air (or gas) reservoir. The air in the reservoir is driven out by the heating of the boiler *l* and is compressed in the absorber *f* to the necessary pressure, owing to the fact that this absorber constitutes a closed vessel of a certain volume, and if more air or gas is driven into this vessel than was contained therein originally a compression must result. The degree of compression will vary with the additional amount of air or gas driven into said vessel by the heating of the boiler, and this amount in turn obviously depends on the capacity of the air-space of the boiler. The compression of the air (gas) to the necessary pressure for refrigerating process by means of an air-pump is therefore either quite unnecessary, if the air-space of the boiler is made sufficiently large, or is only required to a small extent if it is found advisable for convenience of construction or for any reason to reduce the air-space.

What I claim, and desire to secure by Letters Patent, is the following:

1. In a refrigerating apparatus, the combination of a vaporizer and an absorber located one within the other so as to form an annular chamber between them, and means for passing an evaporating liquid and an absorbent liquid respectively over the opposing adjacent surfaces of the vaporizer and of the absorber, so that both liquids will pass close to each other within the same chamber.

2. In a refrigerating apparatus, the combination of two tubes, one surrounding the other at a distance so as to form an annular chamber, and means for passing an evaporating liquid through said chamber over the surface of one tube and an absorbent liquid through the same chamber over the surface of the other tube.

3. In a refrigerating apparatus, the combination of a vaporizer, an absorber, a vessel for receiving the liquid at the delivery end of the absorber, a partition in said vessel, to divide the liquid into two portions, a heater, and means for returning one portion of the liquid to the inlet of the absorber directly, while the other portion is caused to pass through the heater on its return to the inlet of the absorber.

4. In a refrigerating apparatus, the combination of a vaporizer and an absorber located with their active surfaces in proximity to each other and opposing each other within the same chamber, and means for passing an evaporating liquid and an absorbent liquid respectively over the opposing adjacent surfaces of the vaporizer and of the absorber, so that both liquids will pass close to each other within the same chamber.

In testimony whereof I have signed my name to this specification in the presence of two subscribing witnesses.

HERMANN GEPPERT.

Witnesses:
EMIL FEISSPOHL,
WILHELM FLANGER.